No. 891,087. PATENTED JUNE 16, 1908.
H. L. & E. C. LITCHFIELD.
DRAFT EQUALIZER.
APPLICATION FILED MAY 3, 1906.
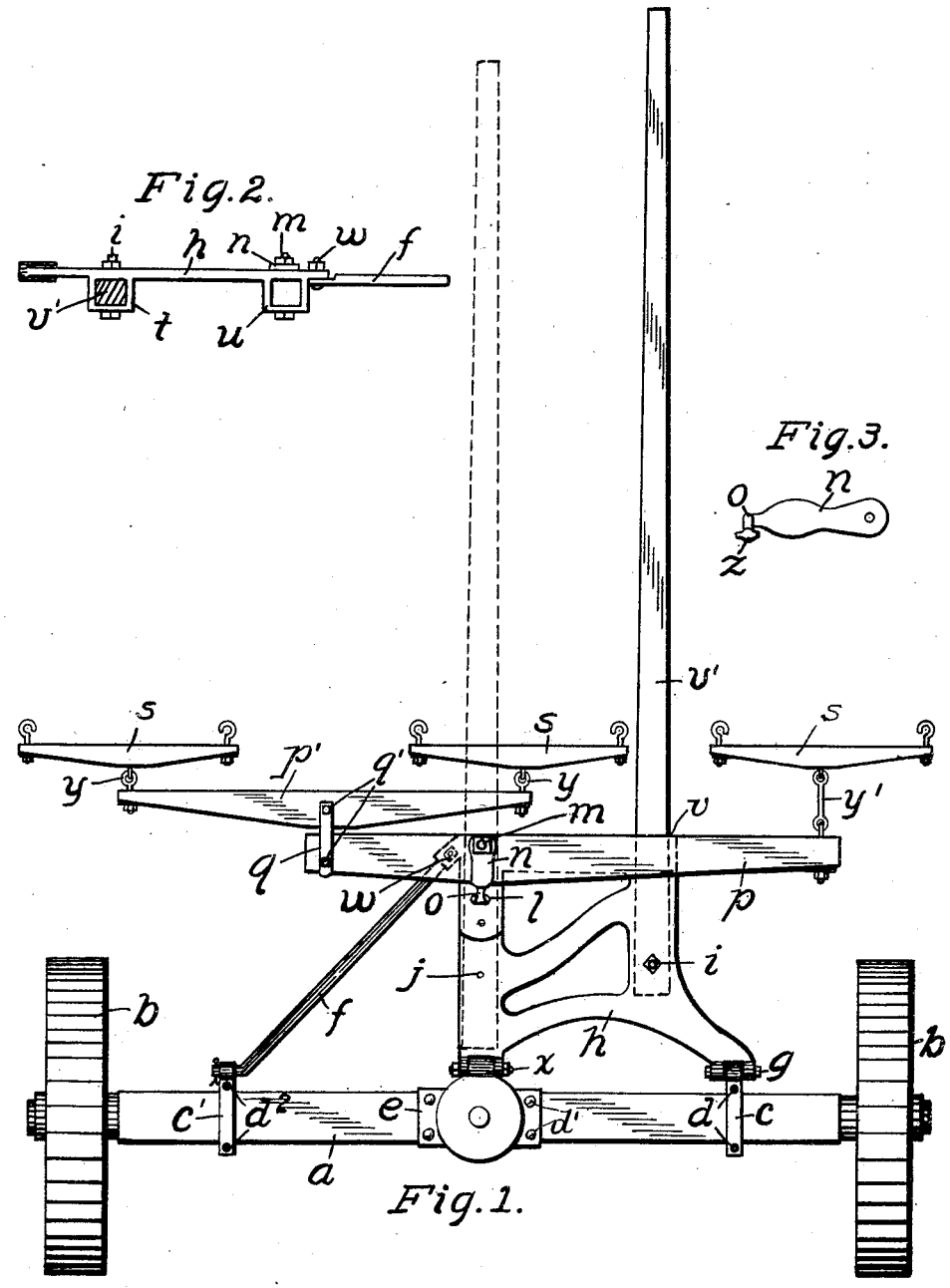
WITNESSES: H.M. Harper, O.D. Young.
INVENTORS H.L. Litchfield & E.C. Litchfield.
BY G.C. Kennedy, ATTORNEY

UNITED STATES PATENT OFFICE.

HENRY L. LITCHFIELD AND EDGAR C. LITCHFIELD, OF WATERLOO, IOWA, ASSIGNORS TO THE LITCHFIELD MANUFACTURING COMPANY, OF WATERLOO, IOWA.

DRAFT-EQUALIZER.

No. 891,087.　　Specification of Letters Patent.　　Patented June 16, 1908.

Application filed May 3, 1906. Serial No. 314,957.

*To all whom it may concern:*

Be it known that we, HENRY L. LITCHFIELD and EDGAR C. LITCHFIELD, citizens of the United States of America, and residents of Waterloo, Blackhawk county, Iowa, have invented certain new and useful Improvements in Draft-Equalizers, of which the following is a specification.

Our invention relates to draft equalizers, and the objects of our improvements are first, to furnish an equalizer suitable for use with either a two or three horse evener; second, to construct the frame thereof of a single integral piece for greater strength, cheapness and simplicity, and third, to provide such frame with such detachable fastening and securing means as will permit of the tongue being rapidly and easily shifted from one of such fastening and securing means to the other. These objects we have accomplished by the means which are hereinafter fully described and claimed, and which are illustrated in the accompanying drawings, in which—

Figure 1 is a plan view of our improved draft equalizer, showing it attached to the front axle of a wheeled vehicle; Fig. 2 is a detail front elevation of the single piece equalizer frame, and Fig. 3 is a perspective under view of the lug-headed extension on the link used to connect the double-tree or the 3-horse evener bar to the equalizer frame.

Similar letters refer to similar parts throughout the several views.

The body frame of our equalizer consists of a one piece casting, although instead of a casting it may be formed otherwise as desired, and it is understood that slight changes in form will not alter the principle involved in our invention. This frame has rearward extensions fitted with bearings for the reception of pivot-bolts $g$ and $x$, said bolts also being secured within bearings in the forward ends of the brackets $c$ and $e$ so as to form hinge connections between said frame and said brackets. Said brackets are bolted to the axle $a$, the latter mounted on carrying wheels $b$, by bolts $d$ and $d'$ respectively. The forward left-hand corner of said frame $h$ is also furnished with a lug $w$ to which the forward end of the brace $f$ is bolted, the rear end of said brace having its outwardly bent end pivoted in a bearing in the forward end of the bracket $c'$, the latter being bolted to the axle $a$ by means of the bolts $d^2$. By means of these above described hinge connections the frame is permitted vertical swinging motion and is strongly braced at three points widely separated on the axle. It will be observed that the frame $h$ being cast in one piece conduces greatly to strength and cheapness. Said frame has two forwardly opening sockets $u$ and $v$, properly situated to receive and secure therein the rear end of the tongue $v'$ when placed for use with a two or a three horse evener respectively. When used for a two horse evener the tongue, as indicated by the dotted lines in Fig. 1, is secured in the socket $u$ by means of a bolt $j$. When the tongue $v'$ is placed in the socket $v$ for use with a three horse evener, as the socket is not as deep as the other one, the tongue is set forward to a greater extent, and is secured in said socket by means of a bolt $i$. In the latter case, the three horse evener bar $p$ is pivoted to said frame $h$ by the bolt $m$, the upper end of said bolt being held in place by the link $n$. Said link $n$ having at its rear a downward extension $z$ with lugs at its lower end projecting longitudinally with the link. A perforation 1 having communicating slots to right and left is provided in the frame $h$, and the lugs on $z$ may be inserted in said perforation when the clamp has been turned through an angle of ninety degrees and then turned back to secure said lugs in the position shown in Fig. 1.

The three horse evener bar $p$ has at its shorter left-hand end an upper and lower bracket bar $q$, said bars being secured to both the evener and the double tree $p'$ by bolts $q'$. The double tree $p'$ carries swingle trees by means of links $y$. The right hand end of the evener $p$ carries a swingle tree $s$ by means of a link connection $y'$.

The full lines in Fig. 1 represent the device connected up to equalize the draft when a three horse evener is used, and the arrangement of the parts is such that the distribution of leverage effectually accomplishes a center draft without deflection from a straight line of direction. As is obvious, the tongue $v'$ may be quickly shifted from one socket to the other by simply removing one bolt, the contacting camerations of each socket securing the tongue against any swinging or lateral movements. The constructing of the frame $h$ in one piece does away with a number of connected elements which might under the stress of hard usage become disconnected or loosened by wear.

Having described our invention, what we claim as new and desire to secure by Letters Patent, is—

1. A draft equalizer, comprising a running gear, a one piece draft plate hinged to the front axle thereof and provided with sockets having securing means and said sockets adapted to interchangeably receive a tongue, and an equalizing device removably secured to said draft plate 2. A draft equalizer, comprising a running gear, a one piece draft plate hinged to the front axle thereof, a tongue, means for removably securing said tongue to one side of said draft plate, means for removably securing said tongue to the other side of said draft plate, and an equalizing device removably connected to said draft plate.

3. A draft equalizer, comprising a running gear, a two-socketed draft device hinged to the front axle thereof, a tongue, means for interchangeably securing said tongue in either of the sockets in said draft device, and an equalizing device for two horses connected to said draft device when said tongue is secured in one of said sockets.

4. A draft equalizer, comprising a running gear, a two-socketed draft device hinged to the front axle thereof, a tongue, means for interchangeably securing said tongue in either of the sockets in said draft device, and an equalizing device for three horses connected to said draft device when said tongue is secured in one of said sockets.

5. In an equalizing device for vehicles, a single piece device hinged to the axle thereof at three widely separated points, such draft-device having a socket for the tongue therein in line with the center of the vehicle and having another socket for the tongue to one side thereof, and means for interchangeably securing a tongue in either of said sockets.

6. In an equalizing device for vehicles, a draft plate hinged to the axle thereof, means for removably and interchangeably connecting a tongue thereto, a tongue, and an equalizing device removably secured to said draft plate.

7. In an equalizing device for vehicles, a solid one-piece draft-plate hinged to the axle thereof, a brace-rod secured to said draft-plate and hinged to said axle, said draft-plate having sockets at the center line and at one side of the center line of said vehicle for the reception of a tongue, a tongue, and means for removably securing such tongue in either of said sockets.

Signed at Waterloo, Iowa, this 18th day of April 1906.

HENRY L. LITCHFIELD.
EDGAR C. LITCHFIELD.

Witnesses:
E. D. STOVER,
C. S. REINHART.